United States Patent [19]

Higgins

[11] Patent Number: 4,545,587

[45] Date of Patent: Oct. 8, 1985

[54] COAXIAL, MULTIPLE-SHAFT FERROFLUID SEAL APPARATUS

[75] Inventor: Donald W. Higgins, Nashua, N.H.

[73] Assignee: Ferrofluidics Corporation, Nashua, N.H.

[21] Appl. No.: 673,545

[22] Filed: Nov. 20, 1984

[51] Int. Cl.[4] .............. F16J 15/40; F16J 15/16
[52] U.S. Cl. ............................ 277/80; 277/135; 308/10
[58] Field of Search .............. 277/1, 80, 135, DIG. 8; 308/10, 36.1, 187.1, 187.2

[56] References Cited

U.S. PATENT DOCUMENTS

| Re. 27,955 | 4/1974 | Rosensweig | 308/10 |
|---|---|---|---|
| 3,612,630 | 10/1971 | Roscaswitz | 308/10 |
| 3,620,584 | 11/1971 | Rosensweig | 308/187.1 |
| 4,293,137 | 10/1981 | Ezekiel | 277/80 |
| 4,380,356 | 4/1983 | Weghaupt | 277/80 X |

Primary Examiner—Robert S. Ward

Attorney, Agent, or Firm—Richard P. Crowley

[57] ABSTRACT

A multiple-shaft coaxial ferrofluid seal apparatus which comprises: a nonmagnetic housing; a central shaft element; and one or more successively coaxial shaft elements about the central shaft element with one or more of the coaxial shaft elements composed of a nonmagnetically permeable shaft section between a first and second magnetically permeable shaft sections. The seal apparatus includes an axial polarized annular permanent magnet together with first and second pole piece elements, the pole piece elements generally aligned with the magnetically permeable shaft sections to provide for a single magnetic structure within the housing and for a closed-loop magnetic flux to retain ferrofluid as a ferrofluid seal between the coaxial shaft elements which provides for hermetic sealing of the rotary motion of two or more of the coaxial shaft elements employing a single magnetic structure. The multiple-shaft coaxial ferrofluid seal apparatus also includes rotary bearings for the coaxial and central shaft element.

14 Claims, 4 Drawing Figures

COAXIAL, MULTIPLE-SHAFT FERROFLUID SEAL APPARATUS

BACKGROUND OF THE INVENTION

Ferrofluid seals for the sealing of single rotary shafts either through the use of a single- or multiple-stage ferrofluid O-ring seal is a well founded and accepted technology. The effective sealing of two or more coaxial shafts in a single housing is quite difficult. Historically the solution to coaxial shaft sealing has been to mount physically one complete seal assembly inside another in order to de-couple the multiple magnetic structures. This approach to ferrofluid sealing of coaxial multiple shafts leads to an excessively large overall assembly which is quite cumbersome, particularly in use in small coaxial shaft diameters. Ferrofluid seals on coaxial, multiple-shaft elements are most desirable since such ferrofluid seals reduce wear on the sealing elements, provide for low drag torque, and may be designed for long ferrofluid seal life.

Typically, coaxial, multiple-shaft apparatus requiring effective sealings are used, for example, in semiconductor processing equipment, such as in sputtering assemblies for the etching or depositing onto a semiconductive wafer, and wherein a shutter, that is a plate with a hole, must be rotated to open and expose a target to a semiconductive wafer on a rotatable table below the target so that the rotating shutter is between the target and the table with the wafer. Another application for coaxial, multiple-shaft devices is for sample manipulation in certain high-vacuum analysis equipment, such as a goniometer, or for the use of X-ray equipment for crystallographic studies. Coaxial seals may be used with other devices wherein an effective seal is required, typically between a subatmospheric and an atmospheric or superatmospheric environment, and the seal is required between coaxial, multiple-shaft elements extending between the environments.

Thus, a seal apparatus for the hermetic sealing of the rotary motion of two or more coaxial shaft elements and for the independent rotation of the shafts in a low cost, compact design employing a ferrofluid seal is desirable.

SUMMARY OF THE INVENTION

The invention relates to a coaxial, multiple-shaft ferrofluid seal apparatus and the method of manufacture and use of such apparatus. In particular, the invention concerns a coaxial, multiple-shaft ferrofluid seal apparatus and wherein a single magnetic structure is employed to provide for multiple ferrofluid O-ring seals about the coaxial shafts in the seal apparatus.

The coaxial, multiple-shaft ferrofluid seal apparatus of the invention provides a multiple-shaft coaxial unit with a single magnetic structure or a single source of magnetic flux for all of the sealing elements within the seal apparatus. The employment of a single annular permanent magnet as a common source of magnetic flux for all ferrofluid seals eliminates the need for multiple magnetic structures and the magnetic shielding between them which is required in the prior art, which requirements are common when mounting one seal inside another in a concentric manner. In addition, the coaxial, multiple-stage seal apparatus employs at least one coaxial shaft element which includes, and is characterized by, a shaft section composed of a nonmagnetically permeable material, such as, for example, bronze or stainless steel series 300, and which is positioned between magnetically permeable shaft sections composed of a magnetical material, such as stainless steel series 400. The coaxial shaft element composed of the magnetically and nonmagnetically shaft sections is designed to permit the magnetic flux from the common magnet source to flow in the desired magnetic flux path and to provide a closed flux loop, so as to retain the ferrofluid as a liquid ferrofluid O-ring seal about the central shaft and one or more coaxial shafts.

The central shaft employed in this seal apparatus may be composed of a magnetically permeable or a nonmagnetically permeable material. Where the shaft is composed of a magnetically permeable material, then the close flux lines may pass through the shaft element to complete the close magnetic flux circuit. Where the central shaft is composed of a nonmagnetically permeable material, then a magnetically permeable pole block structure statically sealed to the central shaft is employed in order to complete the close magnetic flux circuit or a portion of the central shaft length is composed of a magnetically permeable material to close this loop.

Generally, the sealed shafts are composed within a nonmagnetically permeable housing or where a magnetically permeable housing is employed, then the housing must be nonmagnetically shielded. The common magnetic source is composed of an annular permanent magnet and generally one, or preferably two, pole pieces in a magnetic flux relationship with the permanent magnet at the one and the other end. The pole pieces at the one end extending into a close, noncontacting relationship with the outer surface of a coaxial shaft element and the magnetically permeable shaft section of the shaft element to form a radial gap wherein ferrofluid may be retained therein to provide a ferrofluid seal.

The ferrofluid seal apparatus also comprises a plurality of bearing means, such as ball bearing means, to provide support for the independent rotary motion of the central and the coaxial shafts. The common permanent magnet of the magnet source may be comprised of any magnetic material, for example an Alnico #5 or a Sm—Co magnetic metal, or other strongly magnetic material. The ferrofluid is typically ferrofluid which is generally employed for vacuum-type operation and may range from about 100 to 450 cps at 27° C. and typically from 300 to 400 cps and having a saturation magnetization, for example of 200 to 1000 gauss, and generally 300 to 450 gauss. The ferrofluid exclusion seals formed about the central shaft and/or the coaxial shaft element may be typically exclusion seals, that is single-stage seals on each pole piece, but more typically and preferably, are multiple-stage seals of defined pressure capacity, e.g. greater than 15 psi, that is a plurality of separate, spaced apart separate ferrofluid O-ring seals under each pole piece or magnetically permeable shaft section formed by a plurality of knife edges or ridges either in the other end of the pole piece or on the magnetically permeable section of the shaft or the pole block (see for example the Rosensweig patent relating to multiple-stage seals, U.S. Pat. No. 3,620,584, issued Nov. 16, 1971, thereby incorporated by reference).

The coaxial, multiple-stage seal apparatus of the invention thereby provides for hermetic sealing by the employment of ferrofluid O-rings for the rotary motion of two or more coaxial shafts in the seal apparatus and also provides for the independent rotation of the shaft in a compact design. The seal apparatus of the invention is particularly useful in semiconducting processing equipment wherein the central and coaxial shafts extend into a subatmospheric environment to provide for separate rotary motion within that environment of the central and coaxial shaft.

In one embodiment the coaxial, multiple-stage seal apparatus includes two or more coaxial shafts, a nonmagnetic housing and a magnetic structure with each shaft, except for the magnetically permeable central inner shaft, made up of three axial shaft sections: a magnetically permeable section; a nonmagnetically permeable sections, generally placed directly beneath the end of the permanent magnet in the magnetic structure; and another magnetic section. The nonmagnetic shaft section is sandwiched between the first and second magnetic sections of the shaft. The annular permanent magnet, and pole pieces are secured to the inner cylindrical wall surface of the nonmagnetic housing. The coaxial shaft and the central shaft form a series of radial gaps wherein ferrofluid may be retained to form a series of ferrofluid O-ring seals in the single magnetic flux path in the seal apparatus through the pole pieces and then through each of the coaxial shaft elements, as well as the central shaft.

The center shaft is magnetically permeable and acts as the first stage of the return path of the magnetic flux, and the return magnetic flux would be through each successive coaxial shaft outwardly through the magnetically permeable sections of the shaft. The ingoing and outcoming magnetic flux paths back to the magnet would be separated axially by the nonmagnetically permeable shaft section in each of the coaxial shafts. This embodiment thus provides for a ferrofluid sealing of a plurality of coaxial shafts, where the central shaft is magnetically permeable and employing a single annular permanent magnet assembly to form ferrofluid sealing and which permits independent rotation of the sealed shafts and in a compact design.

In other embodiments wherein the central shaft is a nonmagnetically permeable shaft, the use of a common magnetic source and a coaxial shaft, other than the central shaft, having a nonmagnetic section sandwiched between two magnetic sections is still employed; however, the return flux path is provided by the use of a magnetically permeable pole block structure statically sealed and secured to the central, nonmagnetically permeable shaft to provide a flux path. In a further embodiment, also where the central shaft is composed of a nonmagnetically permeable material, the pole block may be employed statically sealed and secured to the nonmagnetically permeable central shaft and a magnetically permeable pole block also sealed and secured statically to the interior wall or adjacent to the nonmagnetically permeable housing and the common magnet structure. The annular permanent magnet with the pole piece secured is made part of an intermediate coaxial shaft element so that the magnetic flux path flows from the magnet in the shaft element outwardly and inwardly to provide two closed-loop magnetic flux paths through the magnetically permeable pole block structures adjacent about the central shaft and about the inner wall of the housing.

The invention will be described for the purposes of illustration only in connection with certain illustrative embodiments; however, it is recognized that various changes, additions and improvements may be made by those persons skilled in the art all falling within the spirit and scope of the invention.

DESCRIPTION OF THE EMBODIMENTS

Figure 1:
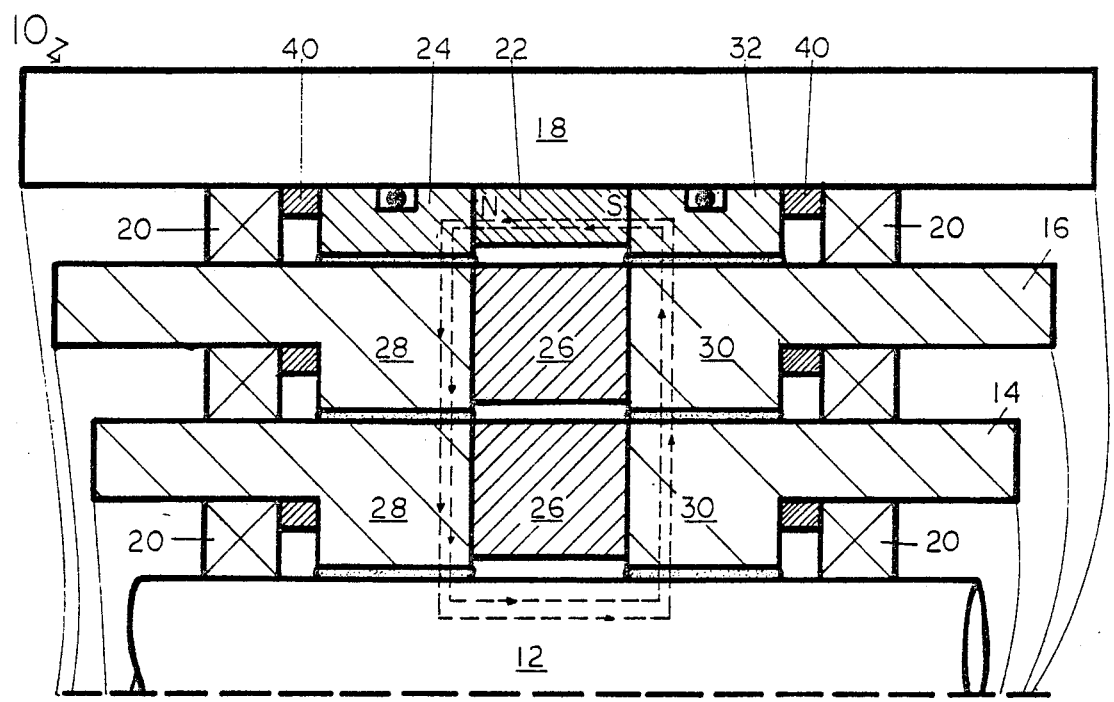
FIG. 1 is a sectional, schematic illustration of a coaxial ferrofluid seal apparatus of the invention.
Figure 2:
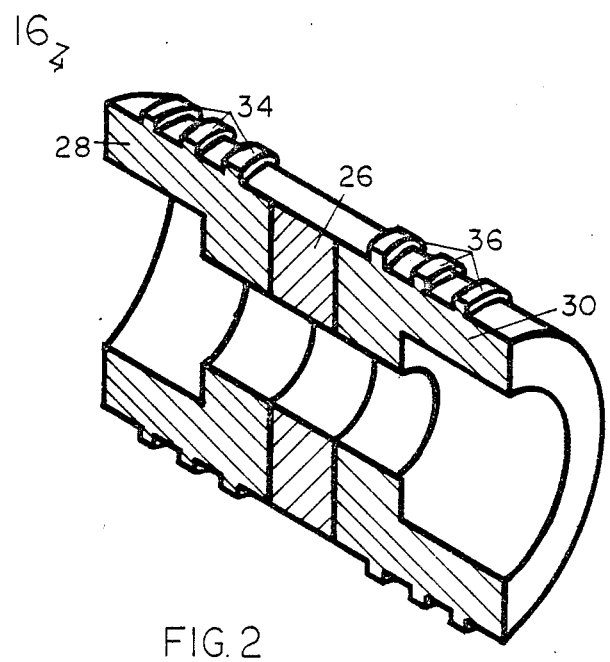
FIG. 2 is a perspective, half-sectional view of a portion of a coaxial shaft which is employed in FIG. 1.

FIG. 1 and FIG. 2 are directed toward a coaxial ferrofluid seal apparatus 10 of the invention, which shows a magnetically permeable central shaft 12 surrounded by coaxial shafts 14 and 16 within a housing 18, with each shaft supported by its own bearings 20, so the each shaft 12, 14 and 16 are capable of independent rotation. As illustrated more particularly in FIG. 2, the coaxial shafts 14 and 16 are composed of three separate sections, two magnetically permeable sections 28 and 30 and a nonmagnetically permeable section 26 between sections 28 and 30 and joined together to form a single shaft. Shaft 16 illustrated in FIG. 2 also represents a shaft 14 which is formed in a similar manner.

The seal apparatus 10 includes within the housing an annular axially-polarized permanent magnet 22 together with adjacent annular magnetically permeable pole pieces 24 and 32. The pole pieces 24 and 32 are statically sealed to the interior wall surface of the nonmagnetically permeable housing through O-ring elastomeric seals. An annular nonmagnetically permeable ring 40 magnetically insulates the magnetically permeable bearing 20 from the pole pieces 24 and 32 and the magnetically permeable shaft sections of shaft 14 and 16.

Pole pieces 24 and 32 are in general alignment with the magnetically permeable sections 28 and 30 of the coaxial shafts 14 and 16. The shafts 12, 14 and 16 contain on the exterior surface of the shaft sections 28 and 30 a plurality of separate knife-like ridges 34 and 36, so that the shafts may form a series of coaxial multiple-stage ferrofluid seals capable of a defined pressure capacity. Of course, if desired, the ridges may be formed on the end of the pole pieces 24 and 32 and magnetically permeable shaft sections 28 and 30 rather than on shafts 14 and 16.

As illustrated in FIGS. 1 and 2, ferrofluid is applied to the multiple-stage of each of the shafts 12 and 14 to form a plurality of multiple ferrofluid O-ring seals between the separately rotating shafts, which will provided a hermetic sealing capability for the coaxial seal apparatus. The seal apparatus 10 is generally employed for and in connection with a semiconductive processing unit wherein on the right hand side of FIG. 1, for example, there is a subatmospheric environment with an atmospheric environment on the left hand side of the seal with the multiple-stage of the seal designed to provide sufficient pressure capacity with a safety factor for all of the shafts.

As illustrated further, the pole pieces 24 and 32 are generally aligned with the magnetically permeable sections of the coaxial shafts 14 and 16, so that the closed loop magnetic flux path, which is shown more particularly in the upper section of FIG. 1 with arrow lines, is through the pole pieces 24 and 32, through the magnetically permeable shaft sections insulated 28 and 30 of the coaxial shafts 14 and 16 and the ferrofluid retained about each shaft with the return flux path through the magnetically permeable central shaft 12. The embodiments of FIGS. 1 and 2 provide for hermetic sealing of the central and a plurality of coaxial shafts, independent rotation of the shafts with a compact design employing a single magnetic structure source, and wherein the central shaft is composed of a magnetically permeable material.

Figure 3:
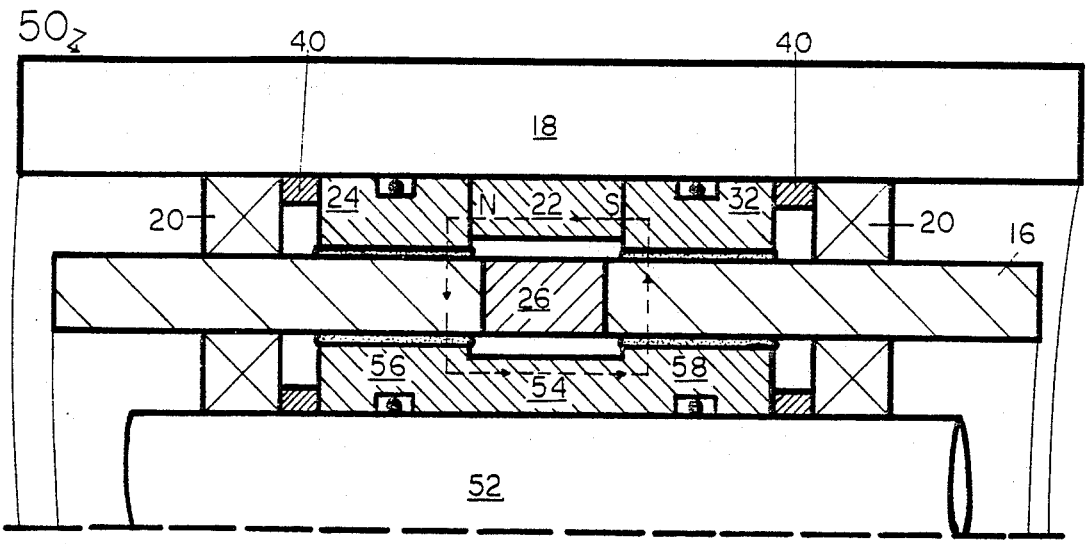
FIG. 3 is a sectional, schematic illustration of another embodiment of a coaxial ferrofluid seal apparatus of the invention.

FIG. 3 illustrates another embodiment of the coaxial multiple-shaft ferrofluid seal apparatus of the invention 50 wherein the central shaft 52 is composed of a nonmagnetically permeable material and wherein the central shaft is surrounded by a single coaxial shaft 16 composed as before in FIG. 2 of a nonmagnetically permeable shaft section 26 with magnetically permeable sections 28 and 30 on either side thereof, and with the annular permanent magnet 22 and the annular pole pieces 24 and 32 secured and sealed to the housing 18 and with the bearings 20 separated through insulating rings 40. Secured to the nonmagnetically permeable shaft 52 is a magnetically permeable annular pole block structure 54 statically sealed by O-rings to the shaft 52 and having raised sections 56 and 58 which extend into a close, noncontacting relationship with the interior surface of the coaxial shaft 16. The pole pieces 24 and 32 extend into a close, noncontacting relationship with the surface of the coaxial shaft 16 on one side, while the extentions 56 and 58 of the pole block structure 54 extend into a close, noncontacting relationship with the interior surface of shaft 16. The pole pieces 24 and the sections 56 and 58 are generally align with the magnetically permeable sections 28 and 30 of the shaft 16. Ferrofluid is disposed in the radial gap between the pole pieces 24 and the sections 56 and 58 to form a single, or preferably a multiple-stage ferrofluid hermetic O-ring seals of defined pressure capacity. The magnetic flux path extends, as illustrated by the arrow and lines, from the magnet 22, through the pole piece 24, the shaft section 28, and pole block section 56, and returns to the magnet through the pole piece section 58, shaft section 30 and pole piece 32. In this embodiment a single magnetic source is used to provide a coaxial ferrofluid seal apparatus wherein the central shaft is composed of a nonmagnetically permeable material by the employment of a magnetically permeable pole block to provide for a return path for the magnetic flux from the single annular magnet.

Figure 4:
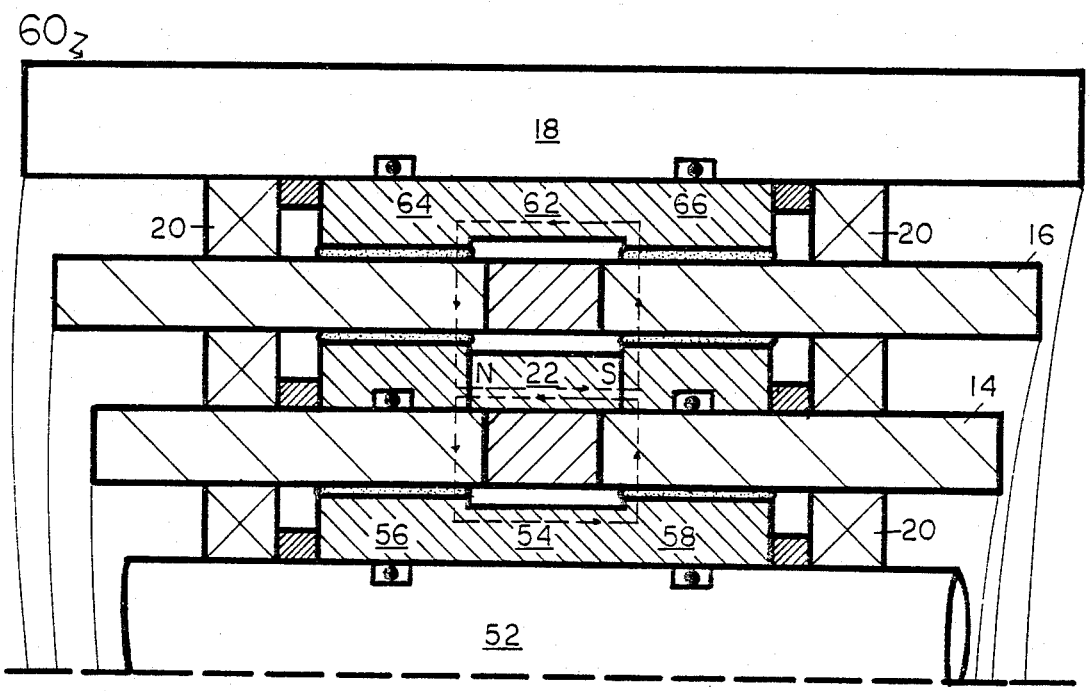
FIG. 4 is a sectional, schematic illustration of a further embodiment of a coaxial ferrofluid seal apparatus of the invention.

FIG. 4 is an illustration of another embodiment of the multiple, coaxial ferrofluid seal apparatus of the invention 60 wherein there is a nonmagnetically permeable central shaft 52 surrounded by coaxial shafts 14 and 16 and wherein the sole magnet apparatus to provide for magnetic flux for all of the ferrofluid seals within the coaxial shaft apparatus is not positioned on the nonmagnetically permeable housing, but rather directly on a rotatable coaxial shaft 14. In the apparatus 60 the pole block 54 is secured by static seals to the central shaft and has legs 56 and 58. The pole block has an annular U-shaped cross section and is composed of a magnetically permeable material to provide for return flux path. Another pole block 62 is statically sealed through elastomeric O-ring seal to the interior wall of the housing 18, has legs 64 and 66, and is also composed of magnetically permeable material. The magnet 22 and pole pieces 24 and 32 are statically sealed through O-ring to the surface of shaft 14. All the coaxial shafts as before are supported by bearings 20 which, if magnetically permeable, as illustrated, are insulated through annular rings 40 from the magnetic flux path. The legs 56, 58, 64 and 66 of the pole block structures are generally aligned with the magnetically permeable sections 28 and 30 of coaxial shafts 14 and 16. The pole pieces 32 and 24 and legs 56, 58 and 64, 66 generally extend into a close, noncontacting relationship with the surfaces of shafts 14 and 16 and ferrofluid is retained within these radial gaps so formed, e.g. 2 to 6 mils, to provide for multiple-stage ferrofluid seal. As illustrated more particularly by the arrowed lines, the flux path travels from the magnet 22 into the pole piece 24 where it splits into two loops, the first flowing outward through shaft section 28, pole piece sections 64 and 66 and returning through shaft section 30 into pole block 32, and the second flowing inward through shaft section 28, pole block sections 56 and 58 and returning through shaft section 30 into pole block 32, rejoining the first loop and continuing into the magnet, wherein the central shaft 52 and the housing 18 are composed of a nonmagnetically permeable material. In this instance, the sole magnetic source structure 22 rotates with coaxial shaft 14.

As illustrated by the described embodiments of the invention, effective hermetic ferrofluid sealing of the rotary motion of two or more coaxial shafts is provided from its independent rotations of the shafts together with a compact design employing a single magnetic structure both with magnetically permeable and nonmagnetically permeable central shafts. The multiple, coaxial shaft ferrofluid seal apparatus provides for reduced wear on the sealing elements, employs a single magnetic structure, and provides for long seal life.

What is claimed is:

1. A coaxial, multiple-shaft ferrofluid seal apparatus, which apparatus comprises:
    (a) a housing;
    (b) shaft elements within the housing and comprising a central shaft and a plurality of spaced apart, coaxial shafts about the central shaft element;
    (c) the coaxial shaft element being characterized by a nonmagnetically permeable insulating shaft section and a first and second magnetically permeable section on either side of the nonmagnetically permeable section, the first and second sections of the coaxial shaft element having surfaces which extend into a close, noncontacting relationship with the surface of adjacent shaft elements and the central shaft to form radial gaps there between;
    (d) a single permanent magnet means including first and second pole pieces, the pole pieces having a one end which extends into a close, noncontacting relationship with the surface of the first and second shaft sections respectively of the coaxial shaft elements to form radial gaps therewith; and
    (e) ferrofluid in the radial gaps to form at least one ferrofluid O-ring seal between the respective surfaces of the shaft elements, the ferrofluid retained in the radial gaps by the magnetic flux from the single permanent magnet means, to provide for the independent sealed rotation of the shaft elements.

2. The seal apparatus of claim 1 wherein the housing comprises a nonmagnetically permeable housing and includes an interior wall surface and wherein the single permanent magnet means is secured and sealed to the interior wall surface of the housing.

3. The seal apparatus of claim 1 wherein the central shaft comprises a nonmagnetically permeable material and which seal apparatus includes a magnetically permeable pole block structural means secured and sealed to the central shaft to provide for a return flux path for magnetic flux from the single permanent magnet means.

4. The seal apparatus of claim 1 wherein the central shaft comprises a magnetically permeable material and provides for a return flux path for the magnet means.

5. The seal apparatus of claim 1 wherein each of the radial gaps provides for a series of separate, multiple-stage ferrofluid O-ring seals so as to provide a defined pressure capacity through the seal apparatus.

6. The seal apparatus of claim 1 wherein the single permanent magnet means is secured and sealed to the surface of one of the coaxial shaft elements.

7. The seal apparatus of claim 1 wherein the housing comprises a nonmagnetically material and the central shaft element comprises a nonmagnetically permeable material and which seal apparatus includes: a single, permanent magnet means secured to one of the intermediate coaxial shaft elements for rotation therewith and wherein the interior wall surface of the housing includes a first magnetically permeable pole block means and the central shaft includes a second magnetically permeable pole block means, the first and second pole block means providing a return flux path for the magnetic flux from the single permanent magnet means disposed intermediate the first and second pole block means.

8. A coaxial, multiple-shaft ferrofluid seal apparatus, which apparatus comprises:
(a) a nonmagnetic housing for the seal apparatus:
(b) a central rotary shaft element in the housing;
(c) one or more successive, spaced apart, coaxial rotary shaft elements extending about the central shaft element;
(d) a single axially polaraized annular permanent magnet to provide a source of magnetic flux;
(e) first and second pole piece elements, the first pole piece adjacent to one and the second pole piece adjacent to one or other end of the permanent magnet and in a magnetic flux relationship with the permanent magnet, the other end of the first and second pole piece elements extending into a close, noncontacting relationship with the surface of at least one of the coaxial shaft elements to form a radial gap;
(f) the coaxial shaft elements characterized by a nonmagnetically permeable shaft section between first and second magnetically permeable shaft sections, the first and second shaft sections generally align in a magnetic flux relationship with the other ends of the first and second pole pieces respectively, and providing a small radial gap between the surfaces of the coaxial shaft elements to form radial gaps therewith;
(g) ferrofluid disposed in the radial gaps between the coaxial shaft elements to provide at least one liquid ferrofluid O-ring seal about the surface on the central shaft and each coaxial shaft element; and
(h) bearing means to provide support for the rotation of the central and coaxial shaft elements, and whereby a closed-circuit magnetic flux path is provided between the first and second magnetically permeable shaft sections, the ferrofluid disposed in the radial gaps, the annular permanent magnet and a magnetically permeable central shaft element or a magnetically permeable pole block element secured to the surface of the nonmagnetically central shaft element.

9. The seal apparatus of claim 8 wherein the annular permanent magnet and the first and second pole pieces are secured to the inner surface of the housing.

10. The seal apparatus of claim 8 wherein the central shaft element comprises a magnetically permeable shaft element.

11. The seal apparatus of claim 1 wherein the central shaft element is composed of a nonmagnetically permeable material and which includes a magnetically permeable block element secured for rotation with the central shaft element, the block element having first and second spaced apart pole sections which extend into a close, noncontacting relationship with the surface of the adjacent coaxial shaft element about the central shaft element to form a radial gap there between and the first and second block section, the pole block section providing for a closed-circuit return magnetic flux path.

12. The seal apparatus of claim 8 wherein the nonmagnetically permeable shaft section is generally the axial length of the annular permanent magnet, and wherein the magnetically permeable first and second shaft sections extend generally the axial length of the first and second pole pieces.

13. A coaxial, multiple-shaft ferrofluid seal apparatus, which apparatus comprises:
(a) a nonmagnetic housing for the seal apparatus;
(b) a magnetically permeable central shaft apparatus extending in the housing;
(c) one or more successive, spaced apart, coaxial shaft elements extending about the central shaft element, each of the coaxial shaft elements composed of a nonmagnetically permeable shaft section between first and second magnetically permeable shaft sections, the magnetically permeable first and second shaft sections extending into a close contact with the adjoining surface of the coaxial shaft or the central shaft to form a radial gap there between;
(d) a single annular permanent magnet adapted to surround the central shaft element and secured to the inner surface of the housing and first and second pole pieces, the first adjacent to one and the second adjacent to the other end of the permanent magnet and in a magnetic flux relationship therewith, the one end of the first and second pole pieces extending into a close, noncontacting relationship with the outer most surface of the coaxial shaft to form a radial gap;
(e) the first and second magnetically permeable shaft sections of each of the coaxial shaft are generally aligned and disposed beneath the first and second pole pieces;
(f) ferrofluid retained in the radial gaps between the surface of the outer most coaxial shaft and the first and second pole pieces and between the radial gaps formed between the coaxial shaft element in the first and second magnetically permeably shaft sections to form on each shaft element a plurality of separate ferrofluid liquid O-ring seals about each of the coaxial shafts and the central shaft; and
(g) bearing means to provide support for the floatation of the central and coaxial shaft elements, and whereby a closed-circuit magnetic flux path to retain the ferrofluid O-ring seals is provided through the central shaft, the first and second magnetically permeable shaft sections of each of the coaxial shafts, the pole pieces and the annular permanent magnet.

14. A coaxial, multiple-shaft ferrofluid seal apparatus, which apparatus comprises:
(a) a nonmagnetic housing for the seal apparatus;
(b) a central nonmagnetically permeable shaft element within the housing;
(c) one or more successfully spaced apart coaxial shaft elements about the central shaft element;
(d) an axially polarized annular permanent magnet to provide a source of magnetic flux and first and second pole piece elements, the first adjacent to one and the second adjacent to the other end in a magnetic flux relationship with the permanent magnet and the one end of the first and second pole piece, each extending into a close, noncontacting relationship with the outer most coaxial shaft element to form a radial gap between the one end of each of the pole pieces and the surface of the outer most shaft element;
(e) the first and second pole piece in the end of the permanent magnet secured to the inner surface of the housing;
(f) the coaxial shaft element is characterized by a nonmagnetically permeable shaft section between first and second magnetically permeable shaft sections, the first or second shaft sections generally aligned under and in a magnetic flux relationship through a radial gap with the first and second pole pieces;
(g) a first magnetically permeable pole block element secured to the nonmagnetically permeable central shaft, the block element having first and second spaced apart magnetically permeable pole elements extending into a close, noncontacting relationship with the coaxial shaft element and with the first and second to form a radial gap there between, generally aligned with and in a magnetic flux relationship with the first and second shaft element sections of the coaxial shaft;
(h) ferrofluid disposed in the radial gaps and retained in the gaps to form a ferrofluid O-ring seal about the shaft elements by the magnetic flux of the annular permanent magnet; and
(i) bearing means to provide support for the rotation of the central and the coaxial shaft elements within the housing, thereby providing seals, central nonmagnetically permeable shafts, and a ferrofluid sealed coaxial shaft element, the magnetic flux path of the permanent magnet extending through the first and second pole pieces, the ferrofluid in the radial gaps and the magnetically permeable first and second shaft sections and the first and second pole block sections.

* * * * *